United States Patent [19]

Magill et al.

[11] Patent Number: 4,946,938

[45] Date of Patent: Aug. 7, 1990

[54] A PROCESS FOR THE CATALYTIC SYNTHESIS OF POLYPHOSPHAZENES

[75] Inventors: J. H. Magill; R. L. Merker, both of Pittsburgh, Pa.

[73] Assignee: The University of Pittsburgh, Pittsburgh, Pa.

[21] Appl. No.: 388,539

[22] Filed: Aug. 1, 1989

[51] Int. Cl.$^5$ .............................................. C08G 79/02
[52] U.S. Cl. ..................................................... 528/399
[58] Field of Search ........................................... 528/399

[56] References Cited

U.S. PATENT DOCUMENTS 4,242,316 12/1980 Sinclair ................................ 423/300
4,440,921 4/1984 Allcock et al. ...................... 528/399
4,523,009 6/1985 Neilson et al. ...................... 528/399

Primary Examiner—Harold D. Anderson
Assistant Examiner—T. Mosley
Attorney, Agent, or Firm—Reed Smith Shaw & McClay

[57] ABSTRACT

The present invention relates to an improved process for the synthesis of polyphosphazenes in which catalytic amounts of a compound selected from the group consisting of toluenesulfonic acid, sulfabenzoic acid, ammonium sulfamate and sulfamic acid, and preferably an effective amount of a promoter compound selected from the group consisting of $CaSO_4.2H_2O$, $CuSO_4.2H_2O$, $NiSO_4.2H_2O$, $CoSO_4.2H_2O$, $MgSO_4.2H_2O$ and $Al(OH)_3$, are added to a reaction mixture of hexachlorocyclotriphosphazene and 1,2,4-trichlorobenzene.

13 Claims, No Drawings

A PROCESS FOR THE CATALYTIC SYNTHESIS OF POLYPHOSPHAZENES

ACKNOWLEDGMENT

The present invention was developed in part with the assistance of the U.S. Office of Naval Research, Chemistry Program.

FIELD OF THE INVENTION

The present invention relates to a novel route for the synthesis of polyphosphazenes and more specifically to the synthesis of polyphosphazene using a catalyst selected from the group consisting of toluenesulfonic acid, sulfabenzoic acid, ammonium sulfamate, ammonium sulfamate and sulfamic acid, and preferably a promoter selected from the group consisting of $CaSO_4.2H_2O$, $CuSO_4.2H_2O$, $NiSO_4.2H_2O$, $CoSO_4.2H_2O$, $MgSO_4.2H_2O$ and $Al(OH)_3$.

BACKGROUND OF THE INVENTION

Inorganic polymers with a backbone of alternating phosphorus and nitrogen atoms are known as polyphosphazenes and have the general structural formula $[(OR)_2P=N]_n$, where n is between 20 and 30,000, preferably 100 and 20,000. Synthesis for such polymers, with a variety of substituents at the phosphorus, are known. Allcock, H. R., *Phosphorus-Nitrogen Compounds*, Academic Press, New York (1972). Such polyphosphazenes exhibit and impart useful properties such as fire retardancy, low temperature flexibility, resistance to chemical attack, biocompatability and thermotropic or liquid crystalline behavior.

The most commonly used synthetic route to linear polyphosphazene is a two step process developed in the mid-1960's and disclosed by Allcock, H. R. et al. in *Polymer Preprints*, 21:111 (1980), the disclosure of which is incorporated herein by reference. The first step of the process is the ring-opening polymerization of the cyclic trimer, hexachlorocyclotriphosphazene, to produce linear high molecular weight polydichlorophosphazene. The ring-opening of hexachlorocyclotriphosphazene to produce polydichlorophosphazene is accomplished by either melt polymerization or solution polymerization as described by Konecny, J. O. et al. in *J. Polymer Sci.*, 36:195 (1959), Jacques, J. K. et al. in *J. Chem. Soc. London*, 2112 (1965) and Allcock et al. in *Inorganic Chem.*, 5:1709 (1966), the disclosures of which are all incorporated herein by reference.

Melt polymerization of hexachlorocyclotriphosphazene is usually carried out in evacuated sealed vessels at temperatures between 230°–300° C. in which heating is continued until the reaction mixture ceases to flow. If polymerization is continued after this stage, the polydichlorophosphazene may crosslink and become unsuitable for further substitution. Crosslinking is very unpredictable and is generally enhanced by the presence of impurities. The reaction time needed to transform hexachlorocyclotriphosphazene into polydichlorophosphazene by melt polymerization synthesis techniques is approximately 24 to 72 hours. When melt polymerization is used in the synthesis of polydichlorophosphazene, the molecular weight distribution of the polyphosphazenes may be less than optimal due to unpredictable crosslinking branching resulting from the long reaction time needed to transform hexachlorocyclotriphosphazene into polydichlorophosphazene.

Solution polymerization of hexachlorocyclotriphosphazene is known involving reacting, in a container attached to a condenser, hexachlorocyclotriphosphazene, 1,2,4-trichlorobenzene and a catalyst. Dry nitrogen is then bubbled through the reaction mixture. The reaction mixture temperature is maintained at approximately 210° C. The reaction time necessary for the hexachlorocyclotriphosphazene to transform into polydichlorophosphazene by solution polymerization is typically less than 3 hours. In solution polymerization the viscosity of the reaction mixture is relatively low and the chain structure can be better controlled. Solution polymerization produces higher molecular weight polymers than does melt polymerization as a result of less branching due to a shorter reaction time. Solution polymerization is generally preferred to melt polymerization.

U.S. Pat. No. 4,242,316 discloses a synthesis for polyphosphazene by solution polymerization in which sulfamic acid is used as a catalyst. However, we have found that polymerization does not occur when sulfamic acid is used in its pure or undecomposed state, but rather occurs only when sulfamic acid is used in its decomposed form.

The second step in the synthesis of linear polyphosphazene is the nucleophilic substitution of the chlorine groups attached to the polydichlorophosphazenes with organic groups. Such nucleophilic substitution is necessary because of the facile hydrolysis of the chlorine substituents of the polydichlorophosphazene in the presence of atmospheric moisture. Such substitution is generally accomplished by reacting polydichlorophosphazene with an alkoxy or aryloxy sodium salt in a suitable solvent, such as tetrahydrofuran, chlorobenzene, benzene or toluene.

An improvement in the speed of the solution ring-opening step of the polymerization process of hexachlorotriphosphazene would be advantageous because it would provide for a higher degree of selectivity in the molecular weight distribution of the polyphosphazene due to the ability of the nucleophilic substituent of the alkoxy or aryloxy salt in the second step to react with the relatively narrow range molecular weight polydichlorophosphazene produced in the first step.

SUMMARY OF THE INVENTION

The present invention relates to a novel route for the synthesis of polyphosphazenes having the general structural formula:

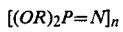

$$[(OR)_2P=N]_n$$

using a catalytic amount of a compound selected from the group consisting of toluenesulfonic acid, sulfabenzoic acid, ammonium sulfamate and sulfamic acid and, preferably a promoter amount of a material selected from the group consisting of $CaSO_4.2H_2O$, $CuSO_4.2H_2O$, $NiSO_4.2H_2O$, $CoSO_4.2H_2O$, $MgSO_4.2H_2O$ and $Al(OH)_3$, wherein, R is selected from the group consisting of $CH_3$, $C_6H_5$, $C_6H_4CH_3$, $CH_2CF_3$, $C_6H_4-C_6H_5$, $C_6H_4-Cl$, $C_6H_4-Br$, $C_8H_{10}$, $(CH_2)_xSi(OR')_3$, $(CH_2)_xCH=CH_2$, $(C_6H_4)(CH_2)_xCH=CH_2$ and $POP(OR'_2)=O$ wherein R' is an alkyl having between 1 and 8 carbon atoms or an aryl having between 6 and 14 carbon atoms and X is a number between 0 and 8, and wherein, n is between 20 and 30,000, preferably between 100 and 20,000.

The synthesis of the polyphosphazene is accomplished by a two step process. The first step of the process involves the ring-opening solution polymerization of the cyclic trimer, hexachlorocyclotriphosphazene, in order to transform it into polydichlorophosphazene. This involves reacting hexachlorocyclotriphosphazene with 1,2,4-trichlorobenzene and catalytic amounts of toluenesulfonic acid, sulfabenzoic acid, ammonium sulfamate or sulfamic acid. Preferably, the decomposition products of ammonium sulfamate or sulfamic acid are used. A compound selected from the group consisting of $CaSO_4 \cdot 2H_2O$, $CuSO_4 \cdot 2H_2O$, $NiSO_4 \cdot 2H_2O$, $CoSO_4 \cdot 2H_2O$ $MgSO_4 \cdot 2H_2O$, and $Al(OH)_3$, preferably $CaSO_4 \cdot 2H_2O$, is preferably added to the mixture during the solution polymerization with the catalyst in promoter amounts, to promote and increase the speed of the solution polymerization reaction.

The second step of the synthesis involves the nucleophilic substitution at the phosphorus atom of the chlorine by reaction with an alkoxy or aryloxy sodium salt to produce the desired polyphosphazene.

DETAILED DESCRIPTION OF THE INVENTION

This novel process in its preferred embodiment relates to the synthesis of polyphosphazenes having the general formula:

$$[(OR)_2 P=N]_n$$

using a catalytic amount of a compound selected from the group consisting of toluenesulfonic acid, sulfabenzoic acid, ammonium sulfamate and sulfamic acid, preferably the decomposition products of ammonium sulfamate or sulfamic acid, and promotional amounts of a compound selected from the group consisting of $CaSO_4 \cdot 2H_2$, $CaSO_4 \cdot 2H_2O$, $NiSO_4 \cdot 2H_2O$, $CoSO_4 \cdot 2H_2O$, $MgSO_4 \cdot 2H_2O$, and $Al(OH)_3$, and preferably $CaSO_4 \cdot 2H_2O$, to promote the speed of the reaction, wherein, R is selected from the group: $CH_3$, $C_6H_5$, $C_6H_4CH_3$, $CH_2CF_3$, $C_6H_4$—$C_6H_5$, $C_6H_4$—Cl, $C_6H_4$—Br, $C_8H_{10}$, $(CH_2)_xSi(OR')_3$, $(CH_2)_xCH=CH_2$, $(C_6H_4)(CH_2)_xCH=CH_2$ and $POP(OR'_2)=O$ wherein R' is an alkyl having between 1 and 8 carbon atoms or an aryl having between 6 and 14 carbon atoms and X is a number between 0 and 8, and wherein n is between 20 and 30,000, preferably between 100 and 20,000.

The synthesis of the present invention permits the manufacture of polyphosphazene in a shorter time with an improved degree of selectivity in the molecular weight distribution of the resulting polyphosphazene.

Preferably the catalytic compounds are present in the reaction mixture in from about 0.05 to 0.60 wt. %, based on the weight of the hexachlorotriphosphazene, and the promoter is preferably present in the reaction mixture in 0.05 to 0.75 wt. %, based on the weight of the hexachlorotriphosphazene.

The polyphosphazenes synthesized by the present process may be accomplished by the following general reaction scheme:

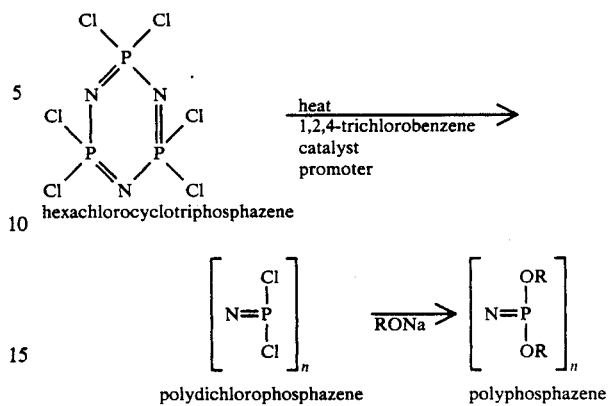

It is believed that the presence of the promoter transforms the catalyst into a more active form, by reducing the initial period where no measurable reaction takes place from about three hours to approximately one hour and speeds up the polymerization reaction by reducing the active polymerization reaction period from two hours to about fifty minutes. The yield of the polyphosphazene that is obtained in the presence or absence of promoter is about the same. The promoter, however, helps to produce faster formation of polyphosphazenes with high molecular weights and narrower molecular weight distributions.

The second step of the synthesis involves the nucleophilic substitution at the phosphorus atom of the chlorine by reaction with an alkoxy or aryloxy sodium salt to produce the desired polyphosphazene by known methods, such as that disclosed by Alcock, H. R. and Kugel, R. L. in *J. Amer. Chem. Soc.*, 87:4216 (1965) and Alcock, H. R. and Kugel, R. L. in *Inorg. Chem.*, 5:1709 (1966), the disclosures of which are incorporated herein by reference.

EXAMPLE 1

Synthesis of Polydichlorophosphazene:

The first step of the synthesis preferably involves the ring-opening, solution polymerization of the cyclic-trimer, hexachlorocyclotriphosphazene, to produce linear high molecular weight polydichlorophosphazene. The hexachlorocyclotriphosphazene (24 gms) with 1,2,4-trichlorobenzene (20 ml) was placed in a 250 ml three neck round bottom flask attached to a condenser. The catalyst, sulfamic acid (50.8 mg) and the promoter, $CaSO_4 \cdot 2H_2O$ (45 mg) were also added to the flask. The reaction mixture was stirred and constantly heated to maintain its temperature at 210° C. The sulfamic acid starts to thermally decompose at a temperature of about 209° C. Dry nitrogen was continuously bubbled through the reaction mixture to maintain an inert atmosphere. The reaction mixture became viscous as the reaction progressed, and the reaction was stopped at a stage when further heating would result in crosslinking. It took about an hour for the reaction mixture to become viscous in the presence of the promoter. The polymer was precipitated by pouring into 400 ml of heptane. The unreacted trimer dissolved in heptane and separated from the polymer. Polydichlorophosphazene was then dissolved in 150 ml of tetrahydrofuran. Crosslinked polymer, if present, does not dissolve in this solvent and may be removed by filtration. The precipitation and filtration was performed in dry box to avoid contact with moisture. The yield of the polydichlorophosphazene was about 40%.

EXAMPLE 2

Synthesis of Polydichlorophosphazene (without a Promoter)

A synthesis identical to that conducted in Example 1 was also conducted in which the $CaSO_4 \cdot 2H_2O$ promoter was not used. Although the polydichlorophosphazene was obtained in similar yields, it took about three hours for the reaction mixture to become viscous.

EXAMPLE 3

Synthesis of Poly[bis(phenoxy)phosphazene]:

In the second step of the synthesis, sodium (11 gms, 97% purity) and 250 ml of tetrahydrofuran were placed in a 500 ml three neck round bottom flask attached to a condenser arrangement. Phenol (50 grams) was dissolved in 150 ml. of tetrahydrofuran. A 10% excess of the phenol was used to ensure that all sodium reacted, as unreacted sodium will react with the polydichlorophosphazene and crosslink the polymer. The solution of phenol was then added dropwise to the sodium suspended in tetrahydrofuran to produce sodium phenoxide. The reaction is exothermic in nature. With aryloxy substituents, refluxing is generally necessary after the addition to complete the reaction.

To ensure complete substitution, the reactants were allowed to react further at room temperature overnight. During this period, a nitrogen atmosphere was maintained in the reaction vessel to exclude moisture from the reaction.

The polydichlorophosphazene of Example 1 dissolved in tetrahydrofuran was then slowly added to the sodium phenol solution, and allowed to react for approximately 48 hours at a reflux temperature of about 70° C. The reaction was stopped when the system became highly viscous (before geling) and the reaction mixture was cooled to room temperature and neutralized with glacial acetic acid. The polymer was isolated by precipitating the reaction mixture in methanol, although precipitation may also be done in water, and purified by dissolving in tetrahydrofuran and followed by precipitation again after removing insoluble impurities. Finally, the samples were dried in vacuum oven, to remove residual solvent. The final product poly[bis(phenoxy)phosphazene] was a white solid, and was obtained in yield of approximately 35%. The resulting poly[bis(phenoxy)phosphazene] product was a very desirable polyphosphazene with a high molecular weight and a narrow molecular weight distribution.

Similar molar quantities of any ROH compounds, such as $CH_3OH$, $HOC_6H_4CH_3$, $HOCH_2CF_3$, $HOC_6H_4-C_6H_5$, $HOC_6H_4Cl$, $HOC_6H_4Br$ and $HOC_8H_{10}$, may be selected and used instead of phenol, depending on the nature of the alkoxy/aryloxy substitution desired in the synthesized polyphosphazene. The specific time and temperature needed for complete substitution will vary slightly depending upon the specific alkoxy/aryloxy sodium salt used.

EXAMPLE 4

A solution polymerization was conducted according to the procedure set forth in Example 1 using predecomposed sulfamic acid instead of pure sulfamic acid to verify that the catalytic activity and induction period depended upon the evolution of decomposed sulfamic acid. Whenever predecomposed sulfamic acid was used, the reaction was completed approximately one hour earlier than when pure sulfamic acid was used. The polymer obtained in each case was identical. The difference in reaction time corresponds to the period required for converting the catalyst into the active degraded form.

EXAMPLE 5

The syntheses of Examples 1 and 3 were repeated in which an equivalent weight percent of ammonium sulfamate was substituted for the sulfamic acid catalyst. All other reaction conditions and techniques remained the same. Similar results and yields of poly[bis(phenoxy)phosphazene] were obtained.

EXAMPLE 6

Sulfamic acid has two functional groups, an acid and an amine. Identification of the catalytically active group was performed by testing different compounds which contained only one of the two groups.

The syntheses of Examples 1 and 3 were repeated in which an equivalent weight percent of toluenesulfonic acid and sulfobenzoic acid were each substituted for the sulfamic acid catalyst. All other reaction conditions and techniques remained the same. Unlike sulfamic acid, no degradation was observed with either the toluenesulfonic acid or sulfobenzoic acid used as a catalyst. Similar results and yields of poly[bis(phenoxy)phosphazene] were obtained. These results clearly suggest that the catalytic activity of sulfamic acid is due to the acid group, and not due to the amine group, which is available in the decomposition product of sulfamic acid.

Although the invention has been described in detail for the purposes of illustration, it is to be understood that such detail is solely for that purpose and that variations can be made therein by those skilled in the art without departing from the spirit and scope of the invention except as it may be limited by the claims.

What is claimed is:

1. In a process for the synthesis of polyphosphazene by solution polymerization of hexachlorocyclotriphosphazene to produce polydichlorophosphazene and the subsequent nucleophilic substitution at the phosphorus of the chlorine with sodium alkyloxide/aryloxide, the improvement comprising the addition of a catalytic amount of a compound selected from the group consisting of toluenesulfonic acid, sulfabenzoic acid, ammonium sulfamate and sulfamic acid, and an effective amount of a promoter compound selected from the group consisting of $CaSO_4 \cdot 2H_2O$, $CuSO_4 \cdot 2H_2O$, $NiSO_4 \cdot 2H_2O$, $CoSO_4 \cdot 2H_2O$, $MgSO_4 \cdot 2H_2O$ and $Al(OH)_3$, to a reaction mixture of hexachlorocyclotriphosphazene and 1,2,4-trichlorobenzene.

2. The process of claim 1 wherein the catalytic compound is sulfamic acid.

3. The process of claim 2 wherein the catalytic compound is the decomposition products of sulfamic acid.

4. The process of claim 1 wherein the catalytic compound is present in an amount of from 0.05 to 0.60 wt. %, based on the weight of the hexachlorocyclotriphosphazene.

5. The process of claim 1 wherein the catalytic compound is selected from the group consisting of toluenesulfonic acid and sulfabenzoic acid.

6. The process of claim 1 wherein the promoter compound is $CaSO_4 \cdot 2H_2O$.

7. The process of claim 1 wherein the promoter compound is present in an amount of from 0.05 to 0.75 wt. % based on the weight of the hexachlorocyclotriphosphazene.

8. In a process for the synthesis of polyphosphazene by solution polymerization of hexachlorocyclotriphosphazene to produce polydichlorophosphazene and the subsequent nucleophilic substitution at the phosphorus of the chlorine with sodium alkyloxide/aryloxide, the improvement comprising the addition of a catalytic amount of a compound selected from the group consisting of toluenesulfonic acid, sulfabenzoic acid, the decomposition products of ammonium sulfamate and the decomposition products of sulfamic acid to a reaction mixture of hexachlorocyclotriphosphazene and 1,2,4-trichlorobenzene.

9. The process of claim 8 wherein the catalytic compound is the decomposition products of sulfamic acid.

10. The process of claim 8 wherein the catalytic compound is present in an amount of from 0.05 to 0.60 wt. %, based on the weight of the hexachlorocyclotriphosphazene.

11. The process of claim 8 wherein a promoter amount of a compound selected from the group consisting of $CaSO_4.2H_2O$, $CuS_4.2H_2O$, $NiSO_4.2H_2O$, $CoSO_4.2H_2O$, $MgSO_4.2H_2O$ and $Al(OH)_3$ is present with the catalyst in an effective amount to promote the synthesis of the polyphosphazene.

12. The process of claim 11 wherein the promoter compound is $CaSO_4.2H_2O$.

13. The process of claim 11 wherein the promoter compound is present in an amount of from 0.05 to 0.75 wt. % based on the weight of the hexachlorocyclotriphosphazene.

* * * * *